United States Patent [19]

Tanimoto et al.

[11] 4,322,185
[45] Mar. 30, 1982

[54] STAGGERED HOB

[75] Inventors: Tatsuo Tanimoto; Ryuichi Ozawa; Noriyoshi Tarumasa, all of Hyogo, Japan

[73] Assignee: Kabushiki Kaisha Kobe Seiko Sho, Kobe, Japan

[21] Appl. No.: 127,531

[22] Filed: Mar. 5, 1980

[30] Foreign Application Priority Data

Jul. 16, 1979 [JP] Japan ............................. 54-98377[U]

[51] Int. Cl.³ ............................................. B26D 1/12
[52] U.S. Cl. ..................................................... 407/23
[58] Field of Search ...................... 407/23, 24, 25, 26, 407/29, 21, 22

[56] References Cited

U.S. PATENT DOCUMENTS

| | | |
|---|---|---|
| 1,393,818 | 10/1921 | Olson . |
| 1,512,657 | 10/1924 | Wildhaber . |
| 1,512,798 | 10/1924 | Ramsay et al. . |
| 1,648,470 | 11/1927 | Anderson . |
| 1,763,983 | 6/1930 | Olson . |
| 1,795,093 | 3/1931 | Olson . |
| 1,812,811 | 6/1931 | Strauss . |
| 2,869,218 | 1/1959 | Lindner . |
| 3,374,518 | 3/1968 | Bentjens . |
| 3,688,368 | 9/1972 | Bodem . |
| 3,715,789 | 2/1973 | Johnson ................................ 407/26 |
| 3,766,618 | 10/1973 | Janninck . |
| 3,863,317 | 2/1975 | Taniguchi et al. ..................... 407/26 |
| 3,911,545 | 10/1975 | Ohashi et al. . |

FOREIGN PATENT DOCUMENTS

| | | |
|---|---|---|
| 1552763 | 6/1969 | Fed. Rep. of Germany . |
| 102801 | 1/1924 | Switzerland . |
| 1195084 | 6/1970 | United Kingdom . |
| 181953 | 6/1966 | U.S.S.R. . |

Primary Examiner—Leonidas Vlachos
Attorney, Agent, or Firm—Oblon, Fisher, Spivak, McClelland & Maier

[57] ABSTRACT

A hob which includes a cylindrical body having a longitudinal axis, a plurality of tooth elements each with a top edge portion of the same height arranged in succession along at least one helical line extending around the longitudinal axis of the hob wherein shoulder portions of leading or trailing sides of each of the tooth elements are reduced in their basic contour in staggered fashion, each of the tooth elements including a first shoulder edge portion intersecting the top edge portion at a distance located 0.05 m to 0.1 m from the center line of each of the tooth elements and a first angle of 25° to 45°, a second shoulder edge portion disposed adjacent the first shoulder edge portion, and a third shoulder edge portion intersecting the second shoulder edge portion at a distance 0.5 m to 1.0 m from the top edge portion at a second angle of 3.5° to 10° wherein m represents a module.

4 Claims, 9 Drawing Figures

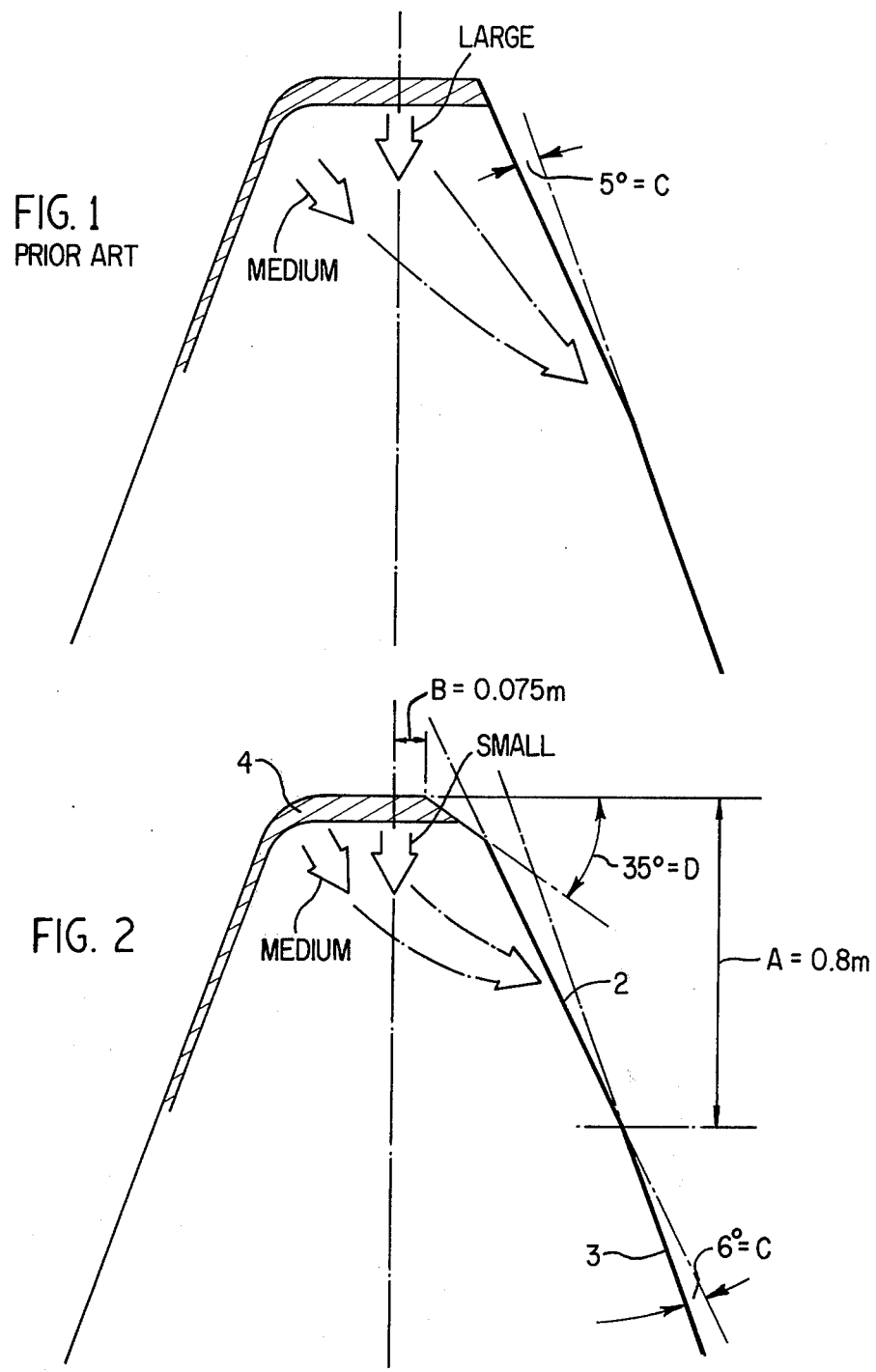

NUMBER OF GROOVES: 6
NUMER OF STARTS: 2

NUMBER OF GROOVES: 6
NUMBER OF STARTS: 1

NUMBER OF GROOVES: 6
NUMBER OF STARTS: 2

NUMBER OF GROOVES: 7
NUMBER OF STARTS: 1

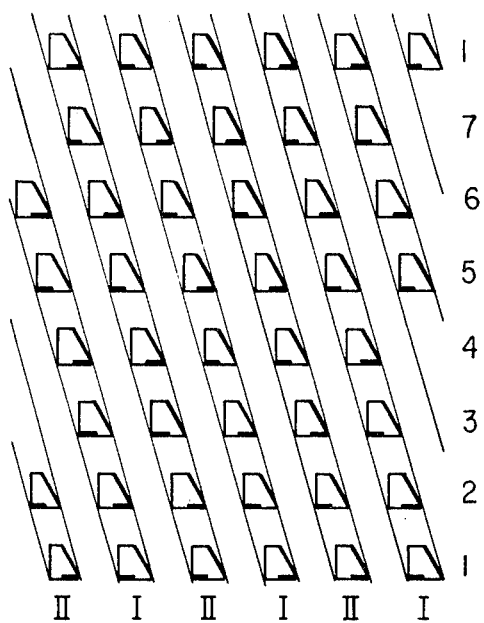
NUMBER OF GROOVES: 7
NUMBER OF STARTS: 2
FIG. 7
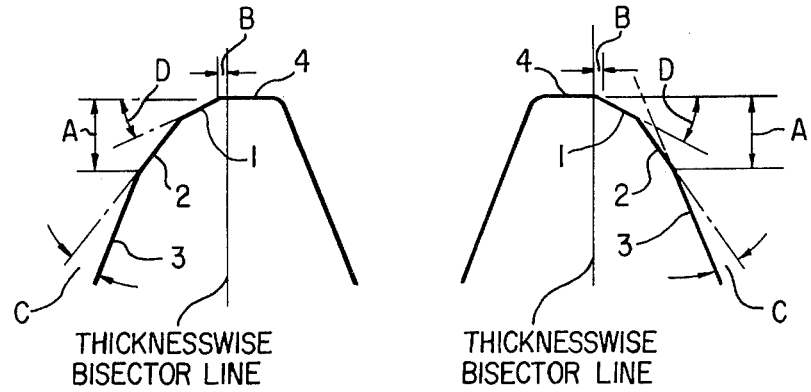
FIG. 8a THICKNESSWISE BISECTOR LINE
FIG. 8b THICKNESSWISE BISECTOR LINE

STAGGERED HOB

BACKGROUND OF THE INVENTION

1. Field of the Invention

This invention relates generally to tooth elements disposed on a cylindrical body so as to form an improved staggered hob.

2. Description of the Prior Art

The utilization of staggered hobs are known in the cutting art. Even so, the hob of the present invention utilizes structural features which have heretofore not been proposed in the construction of hobs. In accordance with the present invention, the processing in the manufacture of a staggered hob is considerably facilitated and the cutting condition at portions of the hob where the wear is heaviest due to a specific flow of chips of material are improved to avoid rapid local wear of the hob. In this regard, the particular structural feature of the present invention essentially resides in a two-staged cut of the hobs.

SUMMARY OF THE INVENTION

Accordingly, it is an object of the present invention to provide a hob wherein the processing and the manufacturing of the hob is considerably facilitated and the cutting condition at various portions of the hob where wear is heaviest due to a specific flow of chips of material is improved with the result that rapid local wear of the hob is avoided.

In order to cope with the present demand for improved cutting conditions and durability of the staggered hob, intense study and research has been conducted on staggered hobs heretofore proposed to determine the best pattern of cuts of the staggered hob. This has resulted in the conclusion that the combinations of cuts falling within the range given in the present invention are effective, when the flow of chips during cutting operation is taken into consideration, with respect to suppression of wear of the tool and improvement in the condition of cutting work.

The staggered hob of the present invention is a cylindrical hob having a cylindrical body with tooth elements of equal radial height disposed along a spiral line or lines (starts) provided on the outer peripheral surface of the cylindrical body. The tooth elements are so arranged along the spiral line or lines at the ratio of the number of grooves to the number of starts (threads) meets any one of the following cases:

(1) number of grooves:number of starts=even number:even number

Typical example of this ratio is 6:2 as is the case of FIG. 3 and FIG. 5

(2) number of grooves:number of starts=even number: odd number

Typical example of this ratio is 6:1 as is the case of FIG. 4

(3) number of grooves:number of starts=odd number:even number

Typical example of this ratio is 7:2 as is the case of FIG. 7

(4) number of grooves:number of starts=odd number:odd number

Typical example of this ratio is 7:1 as is the case of FIG. 6.

BRIEF DESCRIPTION OF THE DRAWINGS

Various objects, features and attendant advantages of the present invention will be more fully appreciated as the same become better understood from the following detailed description when considered in connection with the accompanying drawings in which like reference numerals designate like or corresponding parts throughout the several figures and wherein:

FIG. 1 illustrates the cutting edge and flow of the chip in a conventional hob;

FIG. 2 illustrates the cutting edge and flow of the chip in the present invention;

FIGS. 3–7 illustrate variations of the present invention with respect to the ratio of the number of grooves to the number of starts on the hob; and FIGS. 8a and 8b illustrate the left-side cutting surface and right-side cutting surface of each tooth element of the present invention.

DETAILED DESCRIPTION OF THE PREFERRED EMBODIMENTS

Figure 3:
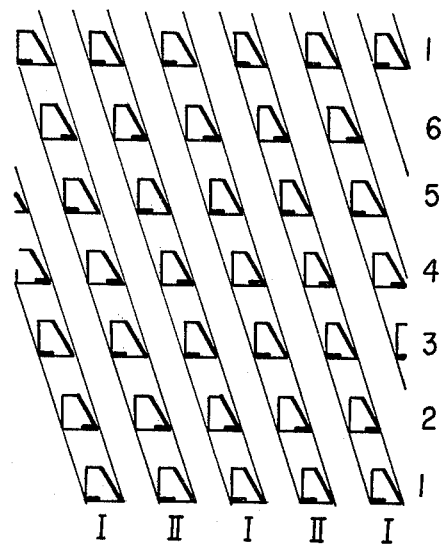
Figure 4:
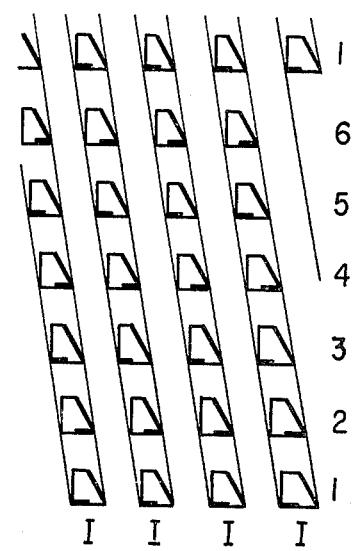
Figure 5:
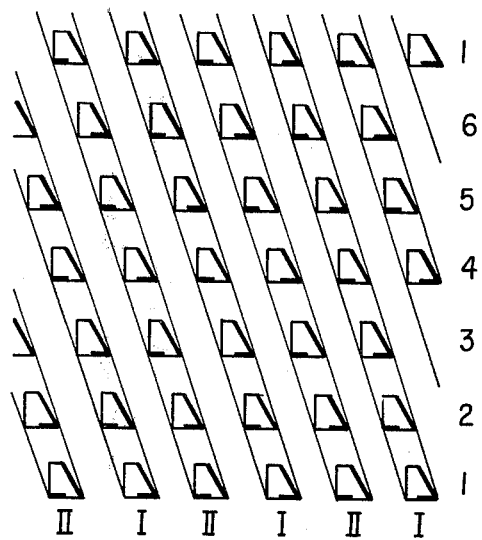
Figure 6:
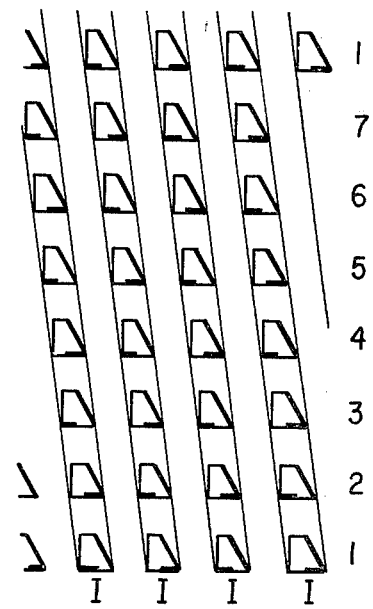

As mentioned hereinabove, the tooth elements of the present invention can be so arranged along the spiral line or lines that the ratio of the number of grooves to the number of starts (threads) can be shown in FIGS. 3–7.

The left-side cutting surface and right-side cutting surface of each tooth element are cut and shaped as illustrated in FIGS. 8a and 8b so as to have the following relationship:

| Length A | Length B | Angle C | | Angle D |
|---|---|---|---|---|
| 0.5m~1.0m | 0.05m~0.1m | single start hob | 3.5°~5° | 25°~45° |
| | | double start hob | 5°~7° | |
| | | triple start hob | 7°~10° | |

*Note
Symbol m represents a module or unit of measurement

It can thus be appreciated that the hob of the present invention includes a cylindrical body having a longitudinal axis of a conventional type, a plurality of tooth elements each with a top edge portion 4 of the same height arranged in succession along at least one helical line extending around the longitudinal axis of the hob wherein shoulder portions of leading or trailing sides of each of the tooth elements are reduced in their basic contour in staggered fashion, each of the tooth elements including a first shoulder edge portion 1 intersecting the top edge portion 4 at a distance located 0.5 m to 0.1 m from the center line of each of the tooth elements at a first angle of 25° to 45°, a second shoulder edge portion 2 disposed adjacent the first shoulder edge portion 1, and a third shoulder edge portion 3 intersecting the second shoulder edge portion 2 at a distance 0.5 m to 1.0 m from the top edge portion 4 at a second angle of 3.5° to 10° wherein m represents a module.

As to the length A, when the length A is decreased to a value below 0.5 m, the chip is cut divided into sections and the directioning of the discharge of chip is lessened which reduces the advantage of the staggered arrangement of the tooth elements. A length A exceeding 1.0 m is effective to prevent cutting of the chips into pieces, to improve the chip-discharge characteristic and to improve the durability of the tool. In the latter case, however, the number of contacts for the formation of involute surface in the generation is small because the length of the worked or cut edge in the heightwise direction of the cutting surface of tooth element is considerably large so that the error of the tooth profile is inconveniently increased due to an increased polygonal error.

As to the length B, since the successive tooth elements disposed in a thread or spiral line are alternatingly worked and cut at their right-side cutting surface and left-side cutting surface (length A, length B and angle C), uncut projections are formed inconveniently in the groove bottom of the gear processed by the hob if the points on the outer periphery of each tooth element at which the line of cutting starts is located on the same side of the thicknesswise bisector line of each cutting edge as the unworked or uncut cutting surface of the tooth element. In addition, as the length B (between the thicknesswise bisector point and the point on the outer peripheral edge surface at which the line of cutting starts) is increased beyond 0.1 m, the width of the chip cut by the outer peripheral surface of the cutting edge is increased resulting in deterioration of the chip-discharging characteristic. Therefore, for obtaining a good result, it is preferred to minimize the overlap of the outer peripheral parts of the right and left-side flanks of the successive tooth elements.

As to angle C, this angle is determined, irrespective of the pressure angle of the hob and in accordance with the number of starts (threads), such that the chip-discharge characteristic (condition of directionality of crator wear appearing on the scooping surface of the hob) is optimized and that the life of the tool is maximized.

As for angle D, the most critical point of this invention is in the determination of angle D. In a conventional hob, supposing that each cutting edge is cut at an angle of C° (5°) to the regular pressure angle only at the point where the flank intersects the outer peripheral surface of the tooth element, the width of the chip cut by the outer peripheral part of the tooth element is enlarged and, at the same time, cutting occurs in the part of the worked or cut portion. As a result, as will be seen from FIG. 1 showing the flow of the chip, the chip flows along a line which is inclined gently with respect to the vertical line, toward the opposite side, as shown by arrow◁, due to a large component of flow produced by the outer peripheral portion of the tooth element. Therefore, the maximum width of wear appears at around the starting point of cutting edge length A, due to the fact that the chip enters into the region where the gap between the tooth element and the tooth surface of the gear is small.

In sharp contrast to the above, the above described shortcoming of the conventional hob having only the primary cut (angle C°) is overcome to reduce the wear at the starting point of A, as will be understood from the following explanation. Namely, the flow component provided by the outer peripheral portion of the tooth element is reduced as shown by an arrow (◁ small) in FIG. 2 by reducing the width of the outer peripheral edge surface of the tooth element. As a result, the flow component provided by the corner of the regular tooth element becomes dominative, so that the chip can reach the opposite side of the tooth element in a shorter time than in the conventional hob shown in FIG. 1 and is biased toward the primary cut. As a result, the edge of the regular tooth element and the starting point of length A are less liable to be worn and damaged so as to provide a prolonged life of the tool.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A hob comprising:
   a cylindrical body having a longitudinal axis;
   a plurality of tooth elements each with a top edge portion of the same height arranged in succession along at least one helical line extending around said longitudinal axis of said hob wherein shoulder portions of leading or trailing sides of each of said tooth elements are reduced from their basic contour in staggered fashion, each of said tooth elements comprising:
   a first shoulder edge portion intersecting said top edge portion at a distance located 0.05 m to 0.1 m from the center line of each of said tooth elements at a first angle of 25° to 45°;
   a second shoulder edge portion disposed adjacent said first shoulder edge portion; and
   a third shoulder edge portion intersecting said second shoulder edge portion at a distance 0.5 m to 1.0 m from said top edge portion at a second angle of 3.5° to 10° wherein m represents a module.

2. The hob as set forth in claim 1 wherein said second angle is 3.5° to 5° and said hob comprises a single start hob.

3. A hob as set forth in claim 1, wherein said second angle is 5° to 7° and said hob comprises a double start hob.

4. A hob as set forth in claim 1, wherein said second angle is 7° to 10° and said hob comprises a triple start hob.

* * * * *